Reissued July 1, 1952 Re. 23,518

UNITED STATES PATENT OFFICE 23,518

ESTERS OF UNSATURATED ACID-BRANCHED CHAIN HEXADIENE POLYMER ADDUCTS

Rupert C. Morris, Berkeley, and John L. Van Winkle, San Lorenzo, Calif., assignors to Shell Development Company, San Francisco, Calif., a corporation of Delaware No Drawing. Original No. 2,555,595, dated June 5, 1951, Serial No. 24,447, April 30, 1948. Application for reissue November 23, 1951, Serial No. 257,934

7 Claims. (Cl. 260—485)

Matter enclosed in heavy brackets [ ] appears in the original patent but forms no part of this reissue specification; matter printed in italics indicates the additions made by reissue.

This invention relates to novel ester compositions and it is particularly directed to esters formed from adducts of various unsaturated acids, or their ester-forming derivatives, and low molecular weight, cyclic polymers of branched chain hexadienes. This application is a continuation-in-part of our co-pending application, Serial No. 562,743, filed November 9, 1944, now Patent No. 2,468,769.

We have discovered that the esters of aliphatic, aromatic or armoatic-aliphatic alcohols or their ester-forming derivatives with the adducts formed by reacting alpha,beta-unsaturated-alpha,beta-dicarboxylic acids or their ester-forming derivatives with low molecular weight, cyclic polymers of branched chain hexadienes having in the molecule a straight chain of five carbon atoms, are particularly useful compounds possessing a wide variety of unusual and unexpected properties. For example, they are valuable as plasticizers and tackifiers for elastomers of many kinds. Many of the esters, particularly those formed from unsaturated alcohols, have drying qualities which render them of outstanding value in coating and impregnating compositions. Others, as those formed from polyhydric alcohols, are actually resinous in character, and can readily be converted into high molecular weight polymer esters of the "alkyd resin" type. In addition to the foregoing properties, the various esters of the present invention are effective biocides and as such are valuable ingredients in many insecticidal compositions.

The low molecular weight, cyclic polymers mentioned above are described in detail in our co-pending application, Serial No. 562,051, filed November 4, 1944, now Patent No. 2,429,582, as well as in the aforesaid parent application, Serial No. 562,743, and while reference is hereby made to said applications for a more complete disclosure on the score of the polymers, it may here be noted that one method of preparing the same is to polymerize a branch chain, 1,3-hexadiene, having a straight chain of five carbon atoms, in the presence of sulfur dioxide and of either oxygen or an oxygen-yielding compound as catalyst. The polymerization is preferably conducted at elevated temperatures, as 80° C. or above, and with a mixture of hexadienes, as 2-methyl-1,3-pentadiene and 4-methyl-1,3-pentadiene. Preferred oxygen-yielding catalysts for this purpose are such peroxides as benzoyl peroxide, tertiary butyl hydroperoxide, and di-(tertiary butyl)-peroxide. An appreciable yield of polymers may be obtained when only traces of peroxide are present. Amounts as small as about 5 milli-equivalents of active oxygen per liter of liquid hexadiene may be sufficient, though improved yields are obtained through the use of between 10 and 100 milli-equivalents of active oxygen per liter of liquid hexadiene. The amount of sulfur dioxide employed may be varied over a wide range, though it is preferred to use at least one mol of this compound per mol of hexadiene reactant.

The low molecular weight polymers can also be produced by the thermal cracking of one or more di-methyl-sulfolenes. The latter compounds are cyclic mono-sulfones which are obtainable by reacting in the liquid phase one or more of the aforedesignated hexadienes (preferably peroxide-free) with sulfur-dioxide, in the substantial absence of molecular oxygen and of oxygen-yielding substances, the reaction being conducted at an elevated temperature which is below that at which the mono-sulfones formed are decomposed. Temperatures in the neighborhood of 100° C. are generally suitable. This method of preparing cyclic mono-sulfones is described in U. S. Patent No. 2,420,834, issued May 20, 1947, and forms no part of the present invention. Typical, suitable cyclic mono-sulfones which may be employed in this manner are 2,2-dimethyl-3-sulfolene, 2,4-dimethyl-3-sulfolene and 2,5-dimethyl-3-sulfolene. The term "sulfolene" is employed herein to designate the unsaturated compound containing four carbon atoms and a sulfur atom in a ring, said structure having a single olefinic linkage between two adjoining carbon atoms, with the sulfur atom having two oxygen atoms attached thereto and with the remaining free bonds of the nuclear carbon atoms being attached to hydrogen atoms. The term is normally prefixed by either 2- or 3- so as to indicate the position of the double bond. This compound has also been termed "thiacyclopentene-1,1-dioxide." In accordance with well recognized nomenclature practice, the term 2- or 3-sulfolene may also form a part of the name of particular compounds wherein one or more of the hydrogen atoms attached to the carbon-sulfur nucleus of the cyclic sulfone compound are substituted by a corresponding number of other functional groups in the numbered position of the ring indicated in the case of each particular compound.

The crude product obtained either from the designated monomeric hexadienes by polymerization in the presence of sulfur dioxide and of oxygen or oxygen-yielding substances, or by the cracking of dimethyl-sulfolenes, is a yellow viscous liquid consisting principally of a mixture of low molecular weight polymers of the hexadienes. It may contain a very small amount (a trace) of sulfur-containing impurities and of unreacted hexadienes. These impurities can be removed and a stable, more uniform product obtained simply by maintaining the polymers at an elevated temperature, desirably 200° to 225° C., preferably under atmospheric or reduced pressures. Heating for 2 to 4 hours is ordinarily satisfactory, although shorter or longer periods may be employed. The thus purified mixture of polymers gives a negative test for sulfur and sulfur-containing compounds. The mixture of polymers may be separated into several fractions by distillation, preferably under reduced pressures, or by other methods such as solvent extraction, etc. Fractions boiling below about 380° C. under atmospheric pressures consist principally of dimers, trimers and tetramers (which contain cyclic structures), of the hexadienes. Approximately 52% of the polymer substance boils above about 490° C. under atmospheric pressures and consists essentially of a mixture of polymers the average, or apparent molecular weight of which is substantially equal to that of a seven-unit polymer (having a polymerization degree of about seven) containing in the molecule the structure

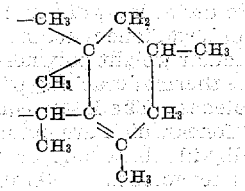

This higher molecular weight fraction is obtained as a yellow, very viscous, sticky liquid, soluble in hydrocarbons. For most purposes the mixture of polymers need not be fractionated but may be employed as such. If desired, however, any fraction or combination of fractions may be used in place of the whole mixture.

The aforesaid hexadiene polymers may be reacted with substantially any alpha,beta-unsaturated-alpha,beta-dicarboxylic acid or ester-forming derivative thereof in order to produce the polymer-acid adducts from which the ester compounds of this invention are prepared. Relatively low molecular weight unsaturated acids having not more than about 8 carbon atoms in the molecule are preferred because of their greater reactivity. However, where the speed of reaction with the polymers is not of primary importance higher acids may be employed. It has been found that the most useful adducts are produced from acid reactants or their derivatives having at least one hydrogen atom attached directly to the alpha or beta carbon atom. In the case of compounds having a "cis" configuration with respect to the carboxyl groups, it is preferred to use the acid anhydrides, rather than the acids themselves or other derivatives thereof. Representative examples of preferred acid anhydride reactants are maleic anhydride, monochloromaleic anhydride, citraconic anhydride, itaconic anhydride, and the like. The corresponding acids of the foregoing anhydrides, or other acids such as fumaric acid, acetylenedicarboxylic acid, etc., as well as the salts, esters and other ester-forming derivatives of these and like compounds may be employed. Mixtures of two or more such unsaturated acid reactants (which term includes the acids, anhydrides, salts, esters and other ester-forming derivatives here described) may also be employed. For technical and economic reasons maleic anhydride is the preferred reactant.

The amount of alpha,beta-unsaturated-alpha,beta-dicarboxylic acid which may be reacted with the low molecular weight cyclic hexadiene polymers may be varied over a wide range. The properties of the polymers are significantly altered and valuable products are produced where ratios as small as about one mol of alpha,beta-unsaturated-alpha,beta-dicarboxylic acid are employed for each about 120 carbon atoms of polymer, i. e., for each 20 hexadiene units combined in the polymer. Such products have improved body, faster drying and/or high oil solubility. Ratios as high as about one molecule of dicarboxylic acid to each hexadiene unit may be employed. The reaction may be carried out in a simple manner by merely intimately mixing the cyclic polymer and the alpha,beta-unsaturated-alpha,beta-dicarboxylic acid and heating the mixture under atmospheric pressures. If desired, one or both of the reactants may be added portion-wise to the reaction mixture at intervals during the reaction, although this procedure is ordinarily not necessary. Under most conditions no appreciable reaction occurs at temperatures below about 175° C., although such lower temperatures may be suitable in some cases. Temperatures of between about 175° C. and about 200° C. are preferred. Higher temperatures ordinarily cause discoloration of the product, particularly where oxygen is present during the reaction. However, where light color is not of primary consideration, temperatures as high as about 300° C. may be employed. The reaction may be carried out in a continuous or discontinuous manner. Atmospheric pressures are ordinarily satisfactory, although superatmospheric pressures may be employed and reduced pressures may be advantageous under some conditions. Where the reaction is carried out under atmospheric pressures reflux conditions may be provided. Gaseous oxygen may be present, although products of somewhat improved color may be obtained by excluding oxygen, conveniently by providing the reaction mixture with a blanket of an oxygen-free fluid, e. g., an oxygen-free gas such as nitrogen, carbondioxide, etc. The time required for the reaction is dependent upon the particular reactants involved, the reaction temperature, etc. With the more reactive acid reactants such as maleic anhydride, the reaction may be substantially complete in an hour or less. In other cases much longer heating times may be required. The preferred procedure in all cases where the initial reaction mixture consists essentially only of cyclic polymers and acid anhydride reactants is to continue heating until a mixture is obtained which on cooling remains in one liquid phase.

Following the reaction, the addition products of the cyclic polymers with the acid reactants may be separated from any other ingredients of the reaction mixture and further purified by any suitable known or special methods. Unreacted acid reactants may usually be removed by distillation, preferably under reduced pressures. Alternatively, unreacted acids and anhydrides may be removed by washing with hot water. Further purification may be effected by solvent extraction and the like.

The above-described polymer-acid addition products employed in forming the esters of this invention vary in viscosity from readily mobile liquids to hard, brittle solids, depending principally upon the nature and the proportions of the reactants. In the case of the reaction of maleic anhydride with an unfractionated mixture of low molecular weight cyclic hexadiene polymers such as may be obtained by the cracking of a dimethyl-sulfolene or by the reaction of a suitable hexadiene under the designated conditions, the influence of the relative proportions of anhydride and polymer in the adduct upon the properties thereof is shown in the following table:

| Reactants | | Polymer-Acid Adduct | | |
|---|---|---|---|---|
| | | | Solubility | |
| Maleic Anhydride (mols) | Hexadiene (combined in polymer) (mols) | Viscosity | In Dilute Alkali | In Mineral Oil [1] |
| 1 | 2 | Hard solid | Readily soluble | Slightly soluble. |
| 1 | 3 | do | Soluble | Do. |
| 1 | 4 | Tacky solid | do | Soluble. |
| 1 | 10 | Viscous liquid | Slightly soluble | Readily soluble. |

[1] Water-white mineral oil consisting principally of saturated aliphatic hydrocarbons.

Representative analyses show that the above addition products correspond to the formula $[(C_6H_{10})_yC_4H_2O_3]_x$, wherein y represents the ratio of hexadiene monomer units to each mol of maleic anhydride in the adduct, and x is that number which, when multiplied by y, gives as product the number of hexadiene monomer units in the molecule. Knowing the molecular weight (M) of the polymer (or its average molecular weight), and the number of hexadiene monomer units remaining the same in both polymer and adduct molecules (averaging about 7.5 with unfractionated polymer mixtures), then x is equal to $$\frac{M}{82y}$$

where 82 is the molecular weight of hexadiene. Conversion of the polymer-anhydride addition products to the acid form may be effected readily by heating a solution of the anhydride product in dilute aqueous alkali for a short time, followed by acidification and recovery of the precipitated acid product. Other methods will be obvious to those skilled in the art.

The ester compounds of the present invention are produced by known esterification procedures employing as reactants the polymer-acid adducts of the type described above and an appropriate alcohol or equivalent ester-forming compound. Alcohols are the preferred class of compounds for supplying the desired radical necessary to the formation of an ester with the adduct and may be employed when said adduct incorporates either acids, acid anhydrides, acid chlorides, or even esters (the desired ester here being formed by the mechanism of ester interchange). However, other compounds can be employed instead of alcohols to form the desired esters, alkyl halides, for example, reacting with the adducts formed from the polymer described above and an acid salt to form the desired ester. Those conditions which have been found conducive to esterification reactions in general may be employed here, as will be discussed more fully in subsequent portions of this description.

The radical which is associated with the adduct to form the ester of this invention may be of either the aliphatic, aromatic or aromatic-aliphatic type and can be derived, as stated above, from an alcohol or any ester-forming derivative thereof. Examples of suitable esterifying radicals are methyl, ethyl, propyl, isopropyl, normal butyl, isobutyl, secondary butyl, tertiary butyl, normal pentyl, isopentyl, secondary pentyl, hexyl normal octyl, isooctyl, normal decyl, isodecyl, dodecyl, tetradecyl, cetyl, stearyl, trimethyl octadecyl, allyl, methallyl, crotyl, ethyl vinyl carbinyl, butenyl, pentenyl, hexenyl, propargyl, geranyl, oleyl, phenyl, naphthyl, anthyl, tolyl, xylyl, secondary butyl-naphthyl, dipropyl-naphthyl, benzoyl, naphthyl-butyl, phenethyl, vinyl-phenyl, crotonyl-naphthyl, methallyl-phenyl, triallyl-naphthyl, naphthylallyl, 2-phenyl-ethenyl, phenyl vinyl carbinyl, cyclopentyl, ethyl-cyclohexyl, tributyl-cyclohexyl, cyclopentenyl, cyclo-hexenyl and vinyl cyclohexenyl. These radicals may be substituted with other elements or groups, as the halides, which do not interfere with the desired esterification reaction.

Esters in which some or all of the carboxyl or equivalent groups in the polymer adduct are esterified with alkyl, aryl, or aralkyl groups, as ethyl, phenyl, or ethylphenyl, are particularly valuable as biocides, though they are also useful as plasticizing compositions, and as organic intermediates.

Other useful ester compounds of this invention are these wherein the adducts are combined with one or more of various unsaturated alcohol radicals. Polymerizable esters of this type include those in which the adducts are esterified with allyl-type alcohols (compounds having a double bond of aliphatic character between two carbon atoms one of which is attached to a saturated carbon atom which in turn is attached to an alcoholic hydroxyl group) as represented by allyl alcohol, methallyl alcohol, chloroallyl alcohol, or crotyl alcohol; with propargyl-type alcohols (compounds having a triple bond of aliphatic character between two carbon atoms one of which is attached to a saturated carbon atom which in turn is attached to an alcoholic hydroxyl group) as represented by propargyl alcohol, etc.; or with vinyl-type alcohols (compounds having a double bond of aliphatic character between two carbon atoms one of which is attached to an alcoholic hydroxyl group) as represented by vinyl alcohol, propen-1-ol-2, etc. Many of these unsaturated esters are useful as plasticizers and tackifiers for elastomers generally, but particularly for natural and synthetic rubbers. Others have drying properties which render them valuable ingredients in coating and impregnating compositions. Further, these unsaturated esters are capable of being readily polymerized into resinous polymers of high molecular weight, this polymerization reaction generally going forward on the application of heat and optionally in the presence of a catalyst. Preferred catalysts for this purpose are peroxides as, for example, benzoyl peroxide, acetyl peroxide, bonzoyl acetyl peroxide, tertiary butyl perbenzoate, tertiary butyl hydroperoxide, di-(tertiary butyl) peroxide, peracetic acid, or the like. Such high molecular weight esters of this invention, besides having many of the useful qualities of the low molecular weight esters, are themselves useful plastic compositions.

The polymer-containing adducts may also be reacted with polyhydric alcohols to produce compounds known as "polyesters." Representative polyhydric alcohols which are suitable for this purpose are glycol, diethylene glycol, triethyleneglycol, propylene glycol, butylene glycol, glycerol, diglycerol, pentaglycerol, pentaerythritol, polypentaerythritols, and polyhydric alcohols produced (actually or theoretically) by the polymerization of unsaturated aliphatic alcohols, as allyl alcohol, or by the hydrolysis of a suitable polyhydric alcohol derivative. Thus, polyvinyl alcohol and polyallyl alcohol may be produced from the corresponding esters, acetals and the like. Instead of, or in addition to, polyhydric alcohols there may be used ester-forming derivatives thereof such as the corresponding epoxides, e. g., glycidol, epichlorohydrin, and the like.

In forming polyesters, it has been found that with adducts wherein the proportion of acid or anhydride to polymer is unusually high, gelling occurs before the esterification process is complete. Accordingly, in producing the polyester compounds of this invention it is preferable to make use of adducts containing no more than about 7% by weight of combined dicarboxylic acid, the range of from 4% to 7% being preferred. In other respects, no limitation need be placed on the ratio of either the components of the various reactants or upon the reactants themselves. Preferably, however, the esters of the present invention are produced under such circumstances that no excess of the alcohol or equivalent ester-forming compound remains in the final ester product. The foregoing polyesters, in addition to having valuable plasticizing and insecticidal properties, are particularly well adapted for conversion into high molecular weight polyesters of the type known as "alkyd resins." Alkyd resins can be produced from low molecular weight polyesters by heating the latter, preferably in the presence of a catalyst such as a suitable metal oxide, e. g., zinc, magnesium, or calcium oxide, or a finely divided metal, e. g., zinc or iron; a suitable liquid catalyst, e. g., furfural, or its derivatives and equivalents (methyl furfural, phenol methyl furfural, furfur-acetone), or a phenol-formaldehyde condensation product. The resin can be produced in the fusible stage and, if desired, be subsequently infusibilized as by the further application of heat. The alkyd resins of this invention are of great value in the manufacture of plastic coating compositions and the like, and many of them are rubbery in character.

The proportions in which the adduct and alcohol reactants are combined to form the esters of the present invention are not critical, though it is preferred that the reaction be conducted under such circumstances that the resulting product contains the maximum possible number of ester linkages. This result may best be obtained by conducting the reaction in the presence of an excess of the alcohol (or its equivalent ester-forming compound), with any excess of alcohol being removed at the end of the reaction.

The esterification reaction may be executed in the presence or absence of a catalyst. Suitable promoters or catalysts which may be used to accelerate the rate of esterification are the strong mineral acids such as $H_2SO_4$, $H_3PO_4$, $H_2S_2O_7$, $HPO_3$, HCl, HBr, $H_4P_2O_7$, $HClO_3$, $HClO_4$, $HNO_3$, and the like. Mineral acid substances of the type of $SO_2Cl_2$, $SOCl_2$, $SOBr_2$, $NO_2$, $N_2O_3$, NOCl, $PCl_3$, $PCl_5$, and the like may also be employed. Inorganic acid-acting salts such as $ZnSO_4$, $ZnCl_2$, $ZnBr_2$, $FeCl_3$, $AlCl_3$, $COCl_2$, $NiCl_2$, $Fe_2(SO_4)_3$, $Al_2(SO_4)_3$, $NaHSO_4$, $NaH_2PO_4$, and the like may also be used. Organic acid-acting compounds such as benzene sulfonic acid, p-toluene sulfonic acid, and their homologues and analogues, dialkyl and acid alkyl sulfates, alkylated phosphoric acid and sulfonic acids, etc., may also be employed alone or in combination with any of the above-mentioned or other suitable substances as catalysts for the esterification reaction.

The esterification reaction may be executed in any number of ways. One method of esterification comprises heating the adduct in contact with the alcohol, preferably in a suitable reaction vessel equipped with agitating means. The reactants may be introduced into the reactor separately, or they may be mixed prior to their introduction thereinto. In many cases it is desirable to effect the esterification by heating the reactants at about the boiling temperature of the reaction mixture and at approximately atmospheric pressure, though in some instances the use of super-atmospheric pressures and/or higher temperatures may be found to speed up the reaction.

The rate of esterification may be increased and the occurrence of undesirable side reactions decreased by operating in such a manner that the water formed as the result of the esterification is removed from the reaction mixture substantially as soon as it is formed. In some instances this removal may be effected by allowing the process to take place at a temperature sufficiently high to permit distillation of the water from the reaction mixture, though a preferred method is to add an azeotrope-forming agent such as benzene or other inert hydrocarbon.

The following examples illustrate the manner in which the present invention finds preferred embodiment:

EXAMPLE I

Hexadiene polymer was produced by placing 904 parts of 2,4-dimethyl-3-sulfolene (prepared, for example, by a practice of the method set forth in detail in either of Examples VI or VII of the aforementioned U. S. Patent No. 2,420,834) in a glass reaction kettle under a water-cooled reflux condenser which was open to the atmosphere and the kettle was heated slowly. When the kettle temperature reached 87° C. decomposition of the sulfone was evident. The temperature was thereafter regulated to provide for the decomposition of the sulfone at such a rate that the sulfur dioxide evolved did not sweep any of the reactant or other products out of the kettle. Evolved sulfur dioxide was discarded. At the end of three hours, when the decomposition was substantially complete, the temperature had reached 151° C. Heating was continued for an additional four hours, the temperature being raised gradually to 191° C. The residue, 494 parts, was a crude mixture of low molecular weight polymers, containing 0.006% of sulfur. The polymer was stabilized and purified by heating in an open vessel exposed to the air at 200–225° C. for four hours. No sulfur could be detected in the purified polymer. In order to obtain a polymer-anhydride adduct suitable for conversion into the ester form, a mixture of 250 parts of the hexadiene polymer, produced as described above, and 299 parts of maleic anhydride were heated under a blanket of nitrogen with constant stirring for 2½ hours under atmospheric pressures. On cooling, the reaction mixture separated into two phases. The mixture was then heated for another 4 to 5 hours at 180° to 185° C., following which the reaction mixture on cooling consisted of only one phase. The reaction mixture was washed with hot water to remove unreacted maleic anhydride and then dried by heating at a relatively low temperature under reduced pressure. A yield of 387 parts of product having the composition $$[(C_6H_{10})_2C_4H_2O_3]_x$$

was obtained. The product was soluble in dilute alkali and slightly soluble in light, saturated mineral oil.

The foregoing addition product was then esterified with ethyl alcohol in the following manner: To a glass kettle attached to a separating head was charged a mixture of 156 parts of the addition product, 244 parts of benzene, 258 parts of ethyl alcohol, and 2 parts of para-toluene sulfonic acid. The mixture was refluxed for 76 hours during which time 19 parts of water were removed. The mixture was then washed with water and excess ethyl alcohol and benzene were removed under vacuum. The product was a viscous liquid having the approximate composition $$[(C_6H_{10})_2.(CH.COOC_2H_5)_2]_x$$

It was found to have particular value as a plasticizer.

EXAMPLE II

A maleic anhydride-polymer adduct was produced in the manner described above in Example I except that here the proportion of polymer to anhydride was such that the resulting addition product had the approximate composition $[(C_6H_{10})_3C_4H_2O_3]_x$. A mixture of 110 parts of the latter compound with 34 parts of diethylene glycol was then placed in a glass reaction kettle and stirred at atmospheric pressure in the presence of air for one hour and 5 minutes, the temperature being gradually increased from an initial value of about 55° C. at the start of the reaction to about 256° C. at its finish. The reaction product at 256° C. was a soft, dark solid having thread-forming properties and the properties of alkyd resins generally. Approximately 10% of the reaction product was soluble in a mixture of equal parts by volume of toluene and amyl acetate.

EXAMPLE III

An alkyd resin was produced in accordance with the procedure outlined in Example II except that in this case glycerol was employed instead of diethylene glycol, and the final reaction temperature was 248° C. The resulting product, when cooled to room temperature, was a moderately hard solid which was more than 10% soluble in a mixture of equal parts by volume of toluene and amyl acetate.

EXAMPLE IV

An unsaturated ester composition is produced by reacting the adduct of Example I with methallyl alcohol, the reactants being employed in the ratio of one part of the adduct to 2.5 parts of the alcohol. The resulting ester has the approximate composition $$[(C_6H_{10})_2.(CHCOOC_4H_7)_2]_x$$

and proves useful as a component of various paints. The product is polymerized into an insoluble material on further heating in the presence of benzoyl peroxide.

Molecular weights referred to herein were determined according to the method described by B. J. Mair in the Bureau of Standards Journal of Research, 14, 345 (1935). The term "unsaturated" as used herein refers to carbon-to-carbon unsaturation of aliphatic character.

We claim as our invention:

1. An ester of a compound selected from the group consisting of the lower oxy-substituted alkyl alcohols, *the lower alkyl monorhydric alcohols, the lower alkenyl monohydric alcohols,* and the low oxy-substituted alkenyl alcohols with an addition product made up of a compound selected from the group consisting of alpha,beta-unsaturated-alpha,beta-dicarboxylic aliphatic acids and the anhydrides, salts and esters of said acids in combination with a low molecular weight unsaturated, cyclic polymer of a branch-chain 1,3-hexadiene having a straight chain of 5 carbon atoms in the molecule.

2. An ester of an alpha,beta-unsaturated lower alkenyl alcohol with an addition product made up of a compound selected from the group consisting of alpha,beta-unsaturated-alpha,beta-dicarboxylic aliphatic acids and the anhydrides, salts and esters of said acids in combination with a low molecular weight unsaturated cyclic polymer of a branch-chain 1,3-hexadiene having a straight chain of 5 carbon atoms in the molecule.

3. The compound of claim 2 where the ester is polymerized to form a high molecular weight polymer.

4. An ester of a lower alkyl polyhydric alcohol with an addition product made up of a compound selected from the group consisting of alpha,beta-unsaturated - alpha,beta - dicarboxylic aliphatic acids and the anhydrides, salts and esters of said acids in combination with a low molecular weight, unsaturated cyclic polymer of a branch-chain 1,3-hexadiene having a straight chain of 5 carbon atoms in the molecule.

5. An ester of ethyl alcohol with an addition product formed between maleic anhydride and a low molecular weight, unsaturated cyclic polymer of a branched-chain 1,3-hexadiene having a straight chain of 5 carbon atoms in the molecule.

6. An ester of diethylene glycol with an addition product formed between moleic anhydride and a low molecular weight, unsaturated cyclic polymer of a branched-chain 1,3-hexadiene having a straight chain of 5 carbon atoms in the molecule.

7. An ester of glycerol with an addition product formed between maleic anhydride and a low molecular weight, unsaturated cyclic polymer of a branched-chain 1,3-hexadiene having a straight chain of 5 carbon atoms in the molecule.

RUPERT C. MORRIS.
JOHN L. VAN WINKLE.

REFERENCES CITED

The following references are of record in the file of this patent or the original patent:

UNITED STATES PATENTS

| Number | Name | Date |
|---|---|---|
| 2,468,769 | Morris | May 3, 1949 |